(12) United States Patent  
Chia et al.

(10) Patent No.: US 6,486,661 B2  
(45) Date of Patent: Nov. 26, 2002

(54) SENSOR BIAS DRIFT COMPENSATION

(75) Inventors: Michael Ik-Ming Chia, Cicero; Seyed R. Zarabadi, Kokomo, both of IN (US)

(73) Assignee: Delphi Technologies, Inc., Troy, MI (US)

( * ) Notice: Subject to any disclaimer, the term of this patent is extended or adjusted under 35 U.S.C. 154(b) by 2 days.

(21) Appl. No.: 09/781,048

(22) Filed: Feb. 12, 2001

(65) Prior Publication Data

US 2002/0109512 A1 Aug. 15, 2002

(51) Int. Cl.[7] ................................................ G01N 27/72
(52) U.S. Cl. ....................................... 324/225; 324/105
(58) Field of Search ........................... 324/166, 207.25, 324/225, 244, 720, 721, 103 P, 105; 327/335, 362; 701/37, 38, 63, 70

(56) References Cited

U.S. PATENT DOCUMENTS 4,833,406 A * 5/1989 Foster ......................... 324/225
5,537,038 A * 7/1996 Ando ........................... 324/253
5,721,486 A * 2/1998 Pape ......................... 324/207.25
6,145,027 A * 11/2000 Alexander et al. ........... 324/251
6,359,586 B1 * 3/2002 Sviestins ...................... 324/451

OTHER PUBLICATIONS

U.S. patent application Ser. No. 09/725,645, filed Nov. 29, 2000.

* cited by examiner

Primary Examiner—N. Le  
Assistant Examiner—Etienne LeRous  
(74) Attorney, Agent, or Firm—Jimmy L Funke

(57) ABSTRACT

A method of removing bias drift from the output signal of a sensor is provided. The method includes sensing a condition with a sensor and generating an output signal, differentiating the output signal, and comparing the differentiated output signal with a threshold change. The method also includes the steps of determining the presence of bias drift based on the comparison, generating a bias adjustment command signal based on the determined presence of bias drift, and adjusting the sensed signal generated by the sensor in accordance with the bias adjusted command signal so as to remove bias drift from the output signal.

20 Claims, 5 Drawing Sheets

SENSOR BIAS DRIFT COMPENSATION

TECHNICAL FIELD

The present invention generally relates to sensors and, more particularly, to a method of compensating bias drift for sensors, such as angular rate sensors.

BACKGROUND OF THE INVENTION

Automotive vehicles are increasingly employing various sensors including angular rate sensors for use in vehicle stability control and rollover detection. These sensors are generally employed to sense a condition and produce an output signal indicative of the sensed condition. Angular rate sensors sense the angular rate of change of movement, such as roll rate, pitch rate, or yaw rate, and produce an output signal indicative of the sensed angular rate of change. A conventional angular rate sensor produces an output voltage signal proportional to the sensed rotational rate of change.

Sensed rate of change events are detected by processing the sensor output voltage signal. These rate events change the sensor output voltage signal much faster than sensor bias drift that is experienced due to temperature changes and aging effects. Many commercially available sensors, such as surface micromachined angular rate sensors, are known to produce an unpredictable non-linear bias drift. As a consequence, the conventional angular rate sensor frequently generates a non-zero, time-varying output signal, even in the absence of a rate of change event. This bias drift may cause an even more significant error in an integration-generated angular position. To minimize this error, the sensor output should be bias drift compensated in order to provide an accurate sensed measurement.

Conventional bias compensation approaches typically employ auxiliary sensors, in lieu of a single angular rate sensor, to compensate for zero-input biases inherent in many angular rate sensors. It should be appreciated that the amount of bias drift may vary depending on the temperature, process imperfections, and stresses due to mechanical shock that the sensor is subjected to and aging.

Accordingly, it is therefore desirable to provide for a method of compensating for bias drift in an output signal of a sensor, such as an angular rate sensor, to produce an output signal having reduced bias drift error. In particular, it is desirable to significantly reduce zero-rate bias drift such that the zero-rate reference is more accurately known and a maximum dynamic range is realized.

SUMMARY OF THE INVENTION

In accordance with the teachings of the present invention, a method of removing bias drift from a sensor output is provided. The method includes the steps of sensing a condition with a sensor and generating an output signal, differentiating the output signal, and comparing the differentiated output signal with a threshold difference. The method further includes the steps of determining the presence of bias drift based on the comparison, generating a bias adjustment command signal based on the determined presence of bias drift, and adjusting the output signal generated by the sensor in accordance with the bias adjusted command signal so as to remove bias drift from the output signal. Accordingly, the bias removal method of the present invention compensates for slow varying bias drift for sensors so as to maintain a substantially zero reference and maximize the dynamic range of the sensor.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
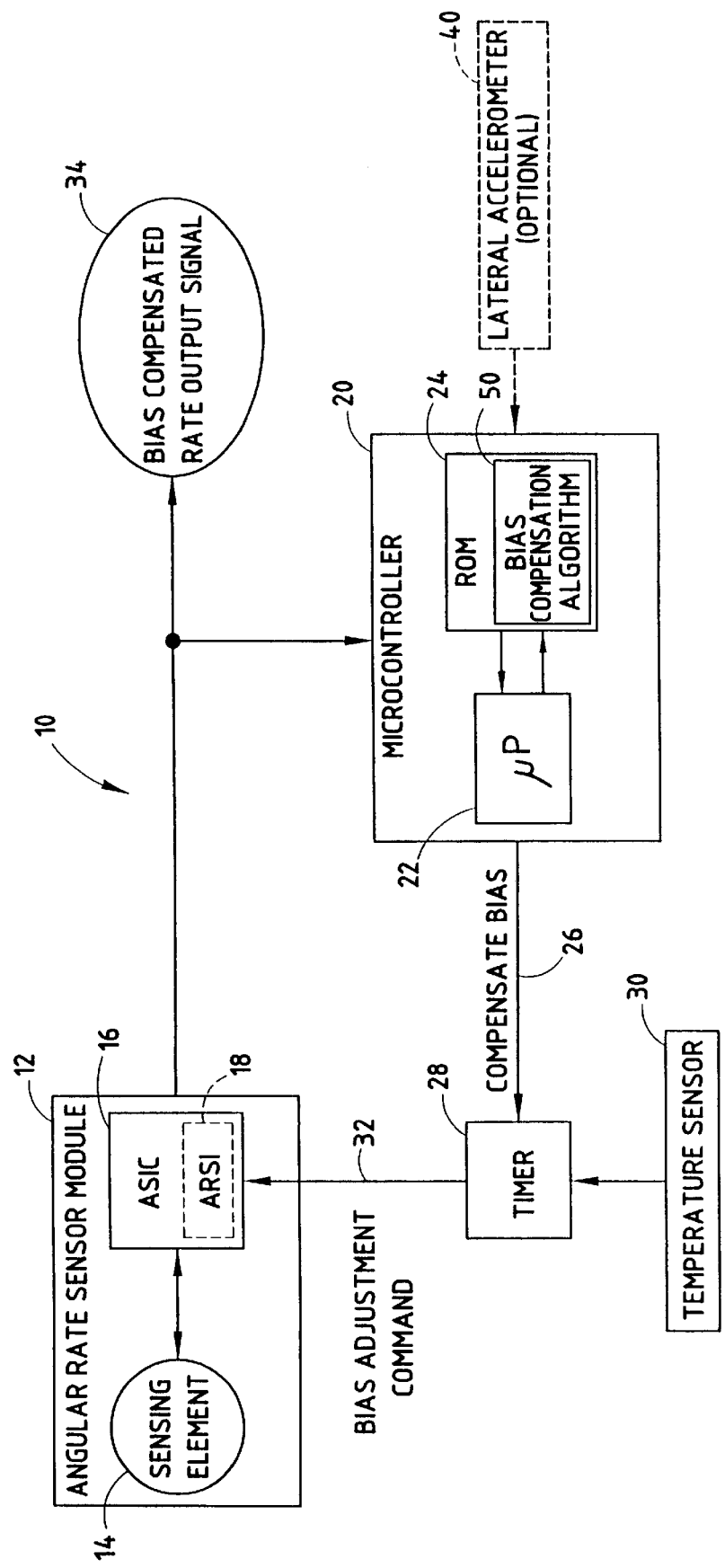
FIG. 1 is a block diagram illustrating a sensor employing bias compensation according to the present invention.

Referring to FIG. 1, a bias compensated angular rate sensor 10 is illustrated for use in sensing angular rate, such as roll angular rate of an automotive vehicle, and providing a bias compensated rate output signal. The angular rate sensor 10 includes an angular rate sensor module 12 for sensing a condition and producing a signal indicative of the sensed condition. The angular rate sensor module 12 senses, as the condition, a rate of angular rotation. While an angular rate sensor is illustrated and described herein, it should be appreciated that the present invention may be employed for use in connection with various types of sensors, including rotational acceleration sensors and linear motion sensors.

The angular rate sensor module 12, according to the example shown and described herein, includes a sensing element 14 for sensing angular rate of change of angular rotation. Also included in the angular rate sensor module 12 is an application specific integrated circuit (ASIC) 16. ASIC 16 includes an angular rate sensor interface (ARSI) 18. The ARSI 18 is preferably implemented on an ASIC 16; however, ARSI 16 may be implemented in other types of digital or analog circuitry. The ARSI 18 allows for offset control of the sensor output so as to compensate for bias drift via a bias adjustment command signal 32 as generated and described herein. According to the embodiment described herein, the angular rate sensor module 12 operates on a zero to five volt fill range scale and produces a zero output signal at its midrange of 2.5 volts. According to one embodiment, the angular rate sensor module 12 generates a voltage greater than 2.5 volts upon sensing a clockwise angular rate of change of rotation, and a voltage less than 2.5 volts upon sensing a counterclockwise angular rate of change of rotation.

The bias compensation sensor 10 employs a bias compensation microcontroller 20 for processing the bias compensated rate output signal 34 and generating a compensate bias signal 26 when bias drift is detected and a rate condition is not sensed. When a rate condition is sensed, as determined by a change in the output signal exceeding a threshold change, the microcontroller 20 provides no compensate bias signal 26 to provide no bias compensation. The microcontroller 20 preferably is a microprocessor-based controller and, according to one example, may include a PIC microcontroller having Model No. 16C73B, made available by Microchip Technology. Generally associated with the microcontroller 20 is a microprocessor 22 and read only memory (ROM) 24 for storing various programmed algorithm(s), including bias compensation algorithm 50 for performing bias compensation, as explained herein. The ROM 24 can be integrated into the microcontroller 20 or provided external thereto. Included in the bias compensation algorithm 50 is logic to discriminate between a rate event or bias drift as explained in connection with the bias compensation algorithm.

In addition, the microcontroller 20 may further receive a sensed lateral acceleration signal generated by a lateral accelerometer 40. The lateral acceleration signal may be employed to sense the presence of lateral motion and disable the bias drift compensation when lateral motion is present. This serves to further ensure that rate is not present when compensating for bias drift and thereby enhances the bias compensation effectiveness.

The bias compensation sensor 10 further includes a timer 28 for providing a count value X that determines when to adjust the sensor output signal to compensate for bias drift. The timer 28 receives a temperature input from a temperature sensor 30 which senses the ambient temperature. The timer 28 has a count value X that is adjustable as a function of the sensed temperature so as to change the rate at which the sensor output signal is adjusted for bias compensation. For example, when the sensed temperature rate of change increases, the count value X is decreased so as to more quickly adjust the bias compensation at the sensor output signal by providing a shorter update time interval.

Figure 2A:
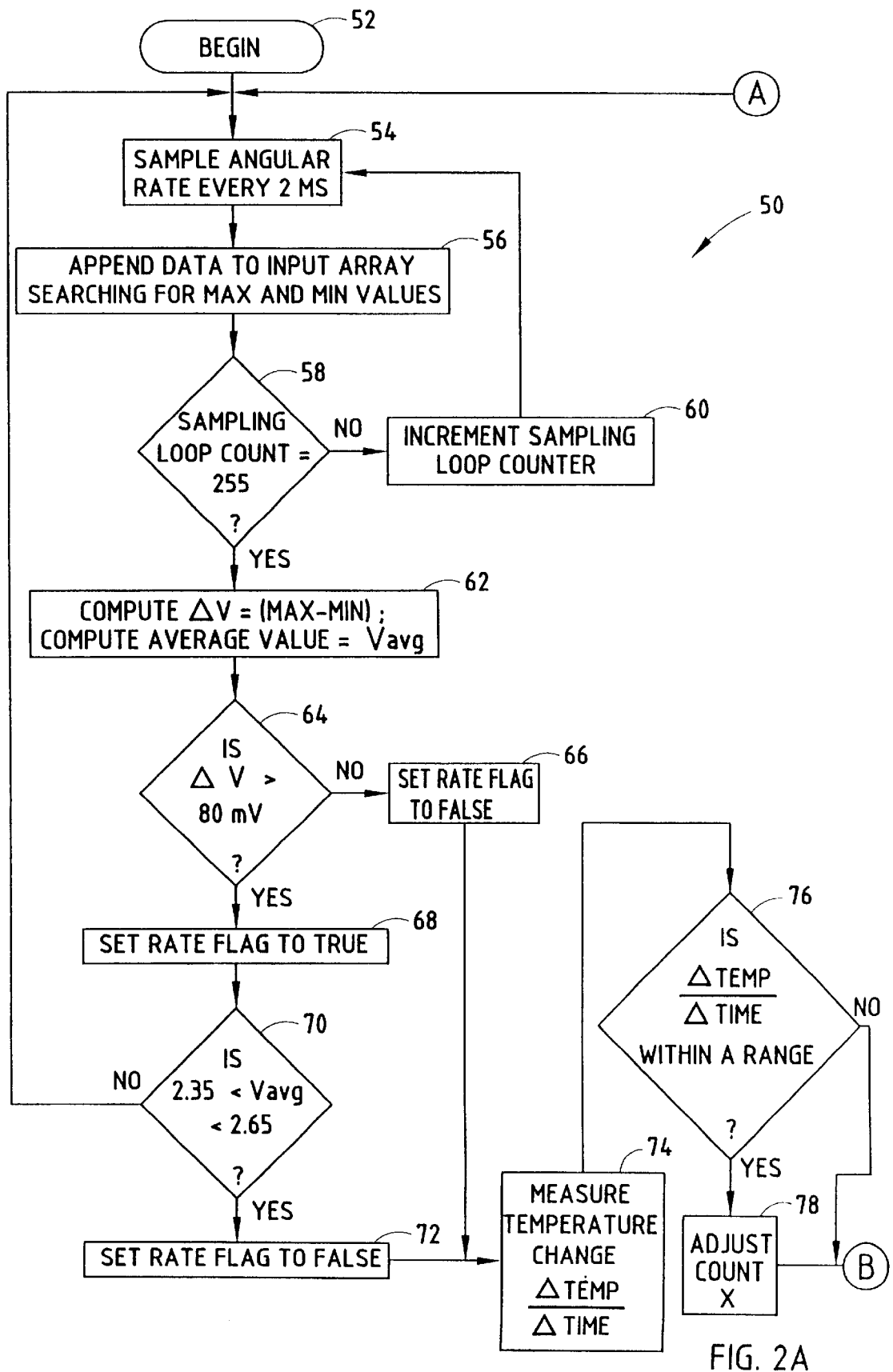
FIGS. 2A and 2B is a flow diagram illustrating a method of compensating for bias drift in an angular rate sensor according to the present invention.
Figure 2B:
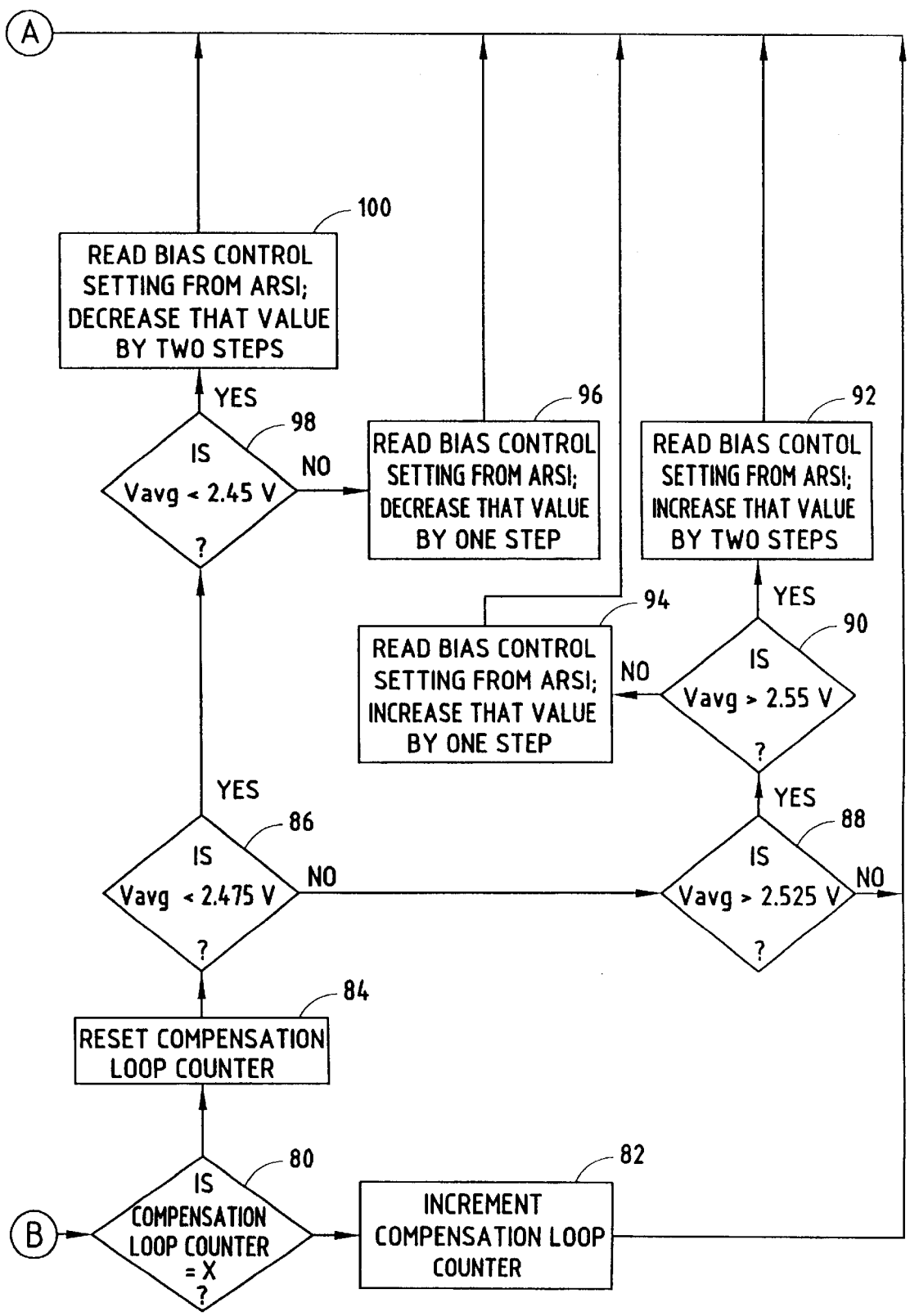

Referring to FIGS. 2A and 2B, a bias compensation method 50, which is implemented as an algorithm processed by microcontroller 20, is shown for compensating bias drift in the angular rate sensor according to one embodiment of the present invention. The bias compensation method 50 begins at step 52 and proceeds to step 54 to sample the angular rate signal-periodically, such as every two milliseconds (2 ms). Proceeding to step 56, the data from the sensed angular rate signal is appended into an input array and the minimum (min.) and maximum (max.) values are searched in step 56. Bias compensation method 50 checks for whether a sampling loop count has reached a count value of two hundred fifty-five (255) in step 58 and, if not, increments a sampling loop counter in step 60, and then proceeds back to step 54.

Once the sampling loop counter has reached a count value of two hundred fifty-five (255), which occurs in a time period of approximately 0.5 second, method 50 proceeds to step 62 to compute difference value $\Delta V$ as the difference between the maximum and minimum sensed values ($\Delta V$= max.–min.), and also computes an average value $V_{avg}$ based on the input array. Difference value $\Delta V$ is a differentiated output signal based on maximum and minimum values sensed within a period of time. The average value $A_{avg}$ may be the mean average of all sensed values within the input array. Bias compensation method 50 then proceeds to decision step 64 to check if the difference value $\Delta V$ is greater than a predetermined threshold change value of eighty millivolts (80 mV) and, if not, sets a rate flag to false in step 66. The predetermined threshold change value of eighty millivolts is selected, according to one example, as the cutoff threshold for determining whether a sensed angular rate is determined to be present. If $\Delta V$ is greater than eighty millivolts, bias compensation method 50 proceeds to step 68 to set the rate flag to true, and then proceeds to decision step 70 to check if the average value $V_{avg}$ is within the range of 2.35 volts to 2.65 volts. If $V_{avg}$ is not within the range between 2.35 and 2.65 volts, bias compensation method 50 returns to step 54. If $V_{avg}$ is within the range of 2.35 to 2.65 volts, the rate flag is set to false in step 72.

Bias compensation method 50 may also include steps 74–78 to adjust the rate at which bias compensation occurs as a function of temperature. In step 74, temperature is measured and a change in temperature over change in time ($\Delta TEMP/\Delta TIME$) is determined. Next, decision step 16 checks for whether $\Delta TEMP/\Delta TIME$ is within a predetermined range and, if so, adjusts the count value X in step 78. The count value X determines the periodic update rate for adjusting the sensor output signal to compensate for bias drift. An increase in count value X increases the time period between successive bias compensation adjustments.

With the count value X selected, bias compensation method 50 proceeds to decision step 80 to check if the compensation loop counter is equal to count value X. If the compensation loop counter has not reached the count value X, the compensation loop counter is incremented in step 82 before returning to step 54. Once the compensation counter has reached count value X, bias compensation method 50 proceeds to step 84 to reset the compensation loop counter, and then further proceeds to decision step 86 to check if the average value $V_{avg}$ is less than 2.475 volts. If $V_{avg}$ is less than 2.475 volts, decision step 88 checks if $V_{avg}$ is greater than 2.525 volts and, if not, returns to step 54. If $V_{avg}$ is greater than 2.52 volts in step 88, decision step 90 checks if $V_{avg}$ is greater than 2.55 volts and, if so, reads a digital bias control setting from the ARSI and increases the bias control value by two steps (increments) in step 92 before returning to step 54. Otherwise, in step 94, the bias control setting from the ARSI is read and increased in value by one step before returning to step 54. The digital bias control setting is converted to an analog offset signal and allows for incremental voltage offset adjustment to be made of the sensor output signal. According to one example, each bias control step provides a twenty millivolt (20 mV) offset adjustment. Accordingly, for a $V_{avg}$ value exceeding 2.55 volts, the intercept value is increased at twice the amount as compared to when $V_{avg}$ is between 2.525 and 2.55 volts.

Returning to decision step 86, if $V_{avg}$ is less than 2.475 volts, bias compensation method 50 proceeds to decision step 98 to determine if $V_{avg}$ is less than 2.45 volts and, if so, reads the bias control setting from the ARSI and decreases the bias control value by two steps in step 100 before returning to step 54. If $V_{avg}$ is not less than 2.5 volts, step 96 reads the bias control setting from the ARSI and decreases the bias control value by one step before returning to step 54. Accordingly, the bias control value (setting) in the ARSI is increased or decreased in steps 92, 94, 96, and 100 depending on the average value, and the change in value only occurs at periodic time intervals when the compensation loop counter has reached the count value X. It should be appreciated that the update rate determined by count value X is adjustable as a function of the sensed temperature. Accordingly, the rate at which bias compensation is provided to the sensed output signals varies depending on the average voltage and temperature.

Figure 3:
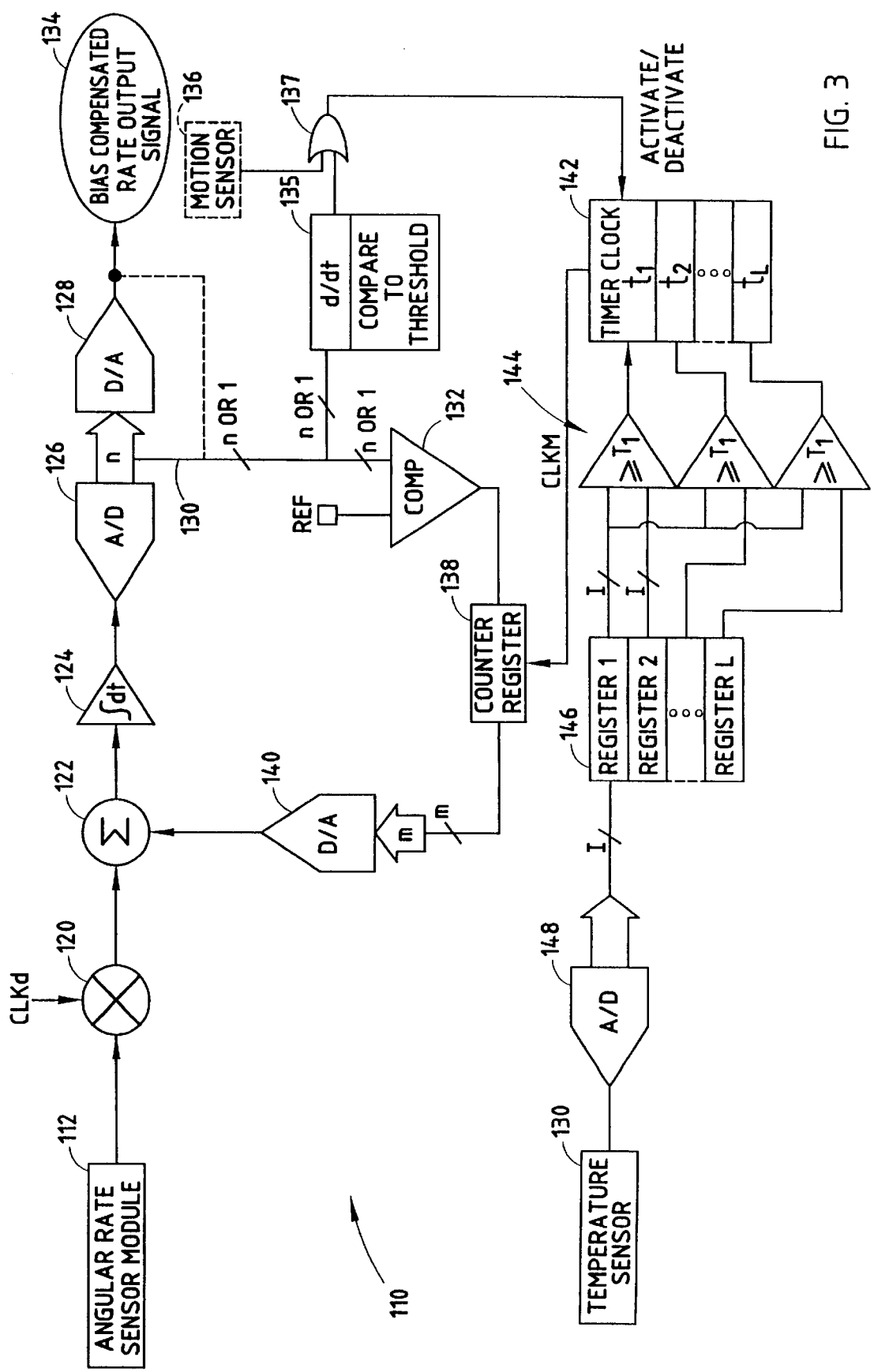
FIG. 3 is a block diagram illustrating an analog circuit for performing bias drift compensation in an angular rate sensor according to another embodiment of the present invention.

The bias compensation of the present invention may also be implemental in analog circuitry 110, as shown in FIG. 3, according to another embodiment. Bias compensation circuit 110 may be integrated into interface electronic circuitry of the angular rate sensor 112, or may be provided external to sensor 112. It should be appreciated that the analog circuit 110 performs bias compensation functions substantially similar to the digital embodiment provided in FIGS. 1, 2A and 2B as discussed above. Accordingly, only a brief description of the analog bias compensation circuit 110 is provided as follows.

Bias compensation circuit 10 includes a mixer 120 which receives the sensor output signal and mixes the signal with a clock signal CLKd to demodulate the signal. The demodulated output signal from mixer 120 is input to a summer 122 which sums the demodulated mixed signal with a feedback signal from a digital-to-analog (D/A) converter 140. The output of the summer 122 is applied as an input to an integrator and filter 124 which produces a DC signal. The DC signal is passed to an analog-to-digital (A/D) converter 126. The feedback signal is generated from the output of the A/D converter 126, through a comparator 132, a counter register 138, and D/A converter 140. A digital-to-analog (D/A) converter 128 converts the digital signal to an analog bias compensated rate output signal 134.

In addition, analog circuit 110 includes a temperature sensor 130 coupled to an A/D converter 148, registers 146, comparators 144, and a timer clock 142 which generates an output CLKM to the counter register 138. In addition, analog circuit 110 further includes an optional motion sensor 136, and a differentiator 134 that differentiates the output of A/D converter 126. The differentiator 134 and motion sensor 136 each provide an input to an OR logic gate 137 which provides an output to timer clock 142. It should be evident to one skilled in the art how to implement the analog bias compensation circuit 110, particularly based on the detailed description of the digital implementation described in detail above.

Figure 4:
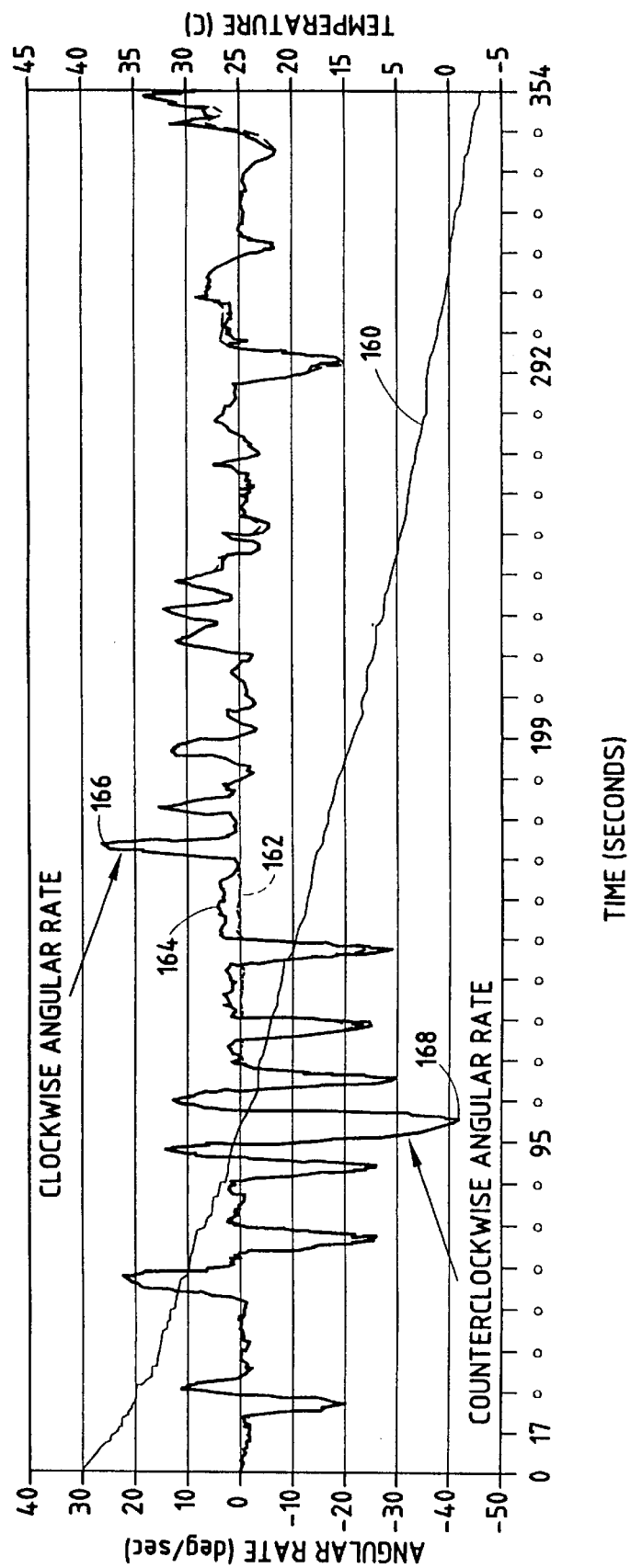
FIG. 4 is a graph illustrating an example of a rate sensor output signal that is bias drift compensated in accordance with the present invention and compared to the actual rate during a temperature variation.

Referring to FIG. 4, one example of a bias compensated output signal 164 as sensed with an angular rate sensor on an angular rate table is illustrated therein during a temperature variation, shown by signal 160, ranging from approximately 40° C. to −3° C. The actual angular rate applied to the angular rate table is shown by signal 162. Angular rate events are sensed as seen by spikes 166 and 168, and bias drift is reduced for slowly varying bias drift. The bias compensated output signal 164 is capable of providing an accurate measurement of angular rate, while at the same time compensating for slowing varying bias drift that may be present in the angular rate sensor, particularly during temperature variations.

Accordingly, the present invention otters bias compensation to eliminate or remove slowly varying bias from the output signal generated by a sensor, such as an angular rate sensor, particularly during temperature variations. The sensor bias compensation presented herein offers a low cost implementation that is desirable for mass-market applications such as in the automotive industry.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

What is claimed is:

1. A method of compensating for bias drift in a signal produced by a sensor, said method comprising the steps of:
    sensing a condition with a sensor and generating an output signal indicative of the sensed condition;
    differentiating the output signal by computing a difference in the output signal during a time period;
    comparing the differentiated output signal with a threshold change;
    determining presence of a bias drift in the output signal based on said comparison;
    generating a bias adjustment command signal based on said determined presence of bias drift; and
    adjusting the output signal generated by the sensor in accordance with the bias adjusted command signal so as to remove the bias drift from the output signal.

2. The method as defined in claim 1, wherein said step of differentiating comprises determining a difference between a maximum output signal and a minimum output signal from an array of output signals sensed during a time period.

3. The method as defined in claim 1 further comprising the steps of:
    sensing temperature rate of change;
    determining a compensation time for adjusting the output signal; and
    adjusting the compensation time as a function of said sensed temperature rate of change.

4. The method as defined in claim 3, wherein said compensation time is decreased when said sensed temperature rate of change increases.

5. The method as defined in claim 1, wherein said bias adjusted command signal is generated based on an average output signal.

6. The method as defined in claim 1, wherein said step of sensing a condition comprises sensing a rate condition.

7. The method as defined in claim 6, wherein said step of sensing a rate condition comprises sensing an angular rate condition.

8. The method as defined in claim 7, wherein said step of sensing an angular rate condition comprises sensing an angular rate condition of a vehicle.

9. A sensor having bias compensation for removing bias drift error for an output signal, said sensor comprising:
    a sensing element for sensing a condition and generating an output signal indicative of the sensed condition; and
    a bias compensation controller for determining the presence of a bias drift and generating a bias adjustment command signal to adjust the output signal to remove the bias drift, wherein said controller differentiates the output signal by computing a difference in the output signal during a time period, compares the differentiated output signal with a threshold change, and determines the bias adjustment command signal as a function of the comparison.

10. The sensor as defined in claim 9, wherein said step of differentiating comprises determining a difference between a maximum output signal and a minimum output signal from an array of output signals sensed during a time period.

11. The sensor as defined in claim 9 further comprising a timer having a count period for determining when to adjust the output signal to reduce bias drift.

12. The sensor as defined in claim 11 further comprising a temperature sensor for sensing temperature rate of change, said timer determining the count period as a function of the sensed temperature rate of change.

13. The sensor as defined in claim 9, wherein said sensing element senses a rate condition.

14. The sensor as defined in claim 13, wherein said sensing element senses an angular rate condition.

15. A bias removal device for removing bias drift error from an output signal generated by a sensor, said bias removal device comprising:

a bias compensation controller for receiving an output signal from a sensor and determining the presence of bias drift, said controller generating a bias adjustment command signal to adjust the sensed output signal to remove the bias drift, wherein said controller differentiates the output signal by computing a difference in the output signal during a time period, compares the differentiated output signal with a threshold change, and determines the bias adjustment command signal as a function of the comparison.

16. The bias removal device as defined in claim 15, wherein said step of differentiating comprises determining a difference between a maximum output signal and a minimum output signal from an array of output signals sensed during a time period.

17. The bias removal device as defined in claim 15 further comprising a timer having a count period for determining when to adjust the output signal to reduce bias drift.

18. The bias removal device as defined in claim 17 further comprising a temperature sensor for sensing temperature rate of change, said timer determining the count period as a function of the sensed temperature rate of change.

19. The bias removal device as defined in claim 15, wherein said device removes bias from an output signal generated by a rate sensor.

20. The bias removal device as defined in claim 19, wherein said device removes bias from an output signal generated by an angular rate sensor.

* * * * *